(12) United States Patent
Deguchi

(10) Patent No.: US 10,296,496 B2
(45) Date of Patent: May 21, 2019

(54) DATA EDITING DEVICE AND DATA EDITING METHOD

(75) Inventor: Hiroshi Deguchi, Tokyo (JP)

(73) Assignees: TOKYO INSTITUTE OF TECHNOLOGY, Tokyo (JP); JAPAN SCIENCE AND TECHNOLOGY AGENCY, Kawaguchi-Shi, Saitama (JP)

(*) Notice: Subject to any disclaimer, the term of this patent is extended or adjusted under 35 U.S.C. 154(b) by 1139 days.

(21) Appl. No.: 14/342,264

(22) PCT Filed: Jul. 5, 2012

(86) PCT No.: PCT/JP2012/004363
§ 371 (c)(1),
(2), (4) Date: Apr. 22, 2014

(87) PCT Pub. No.: WO2013/031075
PCT Pub. Date: Mar. 7, 2013

(65) Prior Publication Data
US 2014/0250124 A1 Sep. 4, 2014

(30) Foreign Application Priority Data
Sep. 1, 2011 (JP) .................. 2011-190601

(51) Int. Cl.
G06F 16/22 (2019.01)
G06Q 40/02 (2012.01)
G06F 8/51 (2018.01)

(52) U.S. Cl.
CPC ............. *G06F 16/22* (2019.01); *G06F 8/51* (2013.01); *G06Q 40/02* (2013.01)

(58) Field of Classification Search
CPC ........ G06F 17/30312; G06F 8/51; G06F 9/45; G06F 8/10; G06F 8/20; G06F 8/31;
(Continued)

(56) References Cited

U.S. PATENT DOCUMENTS 6,076,074 A * 6/2000 Cotton .................. G06Q 20/102
705/35
6,769,095 B1 * 7/2004 Brassard .................. G06F 8/51
715/234
(Continued)

FOREIGN PATENT DOCUMENTS

JP 2005141564 A * 11/2003 ............. G05B 19/05
JP 2010176559 A * 8/2010 ............. G06F 17/21
(Continued)

OTHER PUBLICATIONS

Deguchi, Hiroshi, Yuji Onuki, Shungo Sakaki, "Joho Bakuhatsu Jidai no Kokumin Keizai Keisan no Architecture Design", Dai 70 Kai (Heisei 20 Nen) Zenkoku Taikai Koen Ronbunshu (5), Mar. 13, 2008, pp. 5-79 to 5-80 (IK-3).*
(Continued)

*Primary Examiner* — Jay A Morrison
*Assistant Examiner* — Antonio J Caiado
(74) *Attorney, Agent, or Firm* — Cantor Colburn LLP

(57) ABSTRACT

A data storage unit of a data editing apparatus stores both a base indicating a data attribute and a data value in association with each other as data to be edited. A code acquisition unit acquires a user code, which is a code described in a first program language for describing data editing details by intensive notation and which describes editing details for the data to be edited that are based on the base. A code generation unit generates, in accordance with a predetermined correspondence relationship between a second program language for describing data editing details by extensive notation and the first program language, an execution code described in the second program language based on the user code. An editing processing unit edits the data to be edited in accordance with the execution code.

7 Claims, 9 Drawing Sheets

(58) Field of Classification Search
CPC ..... G06F 8/33; G06F 8/34; G06F 8/38; G06F 8/71; G06F 17/24; G06F 16/22; G06F 9/3604; G06F 9/3608; G06F 9/3688; G06F 9/4443; G06Q 40/02; G06Q 10/06
USPC ........................................................ 707/736
See application file for complete search history.

(56) References Cited

U.S. PATENT DOCUMENTS

| | | | | |
|---|---|---|---|---|
| 7,322,013 | B1* | 1/2008 | Benson | G06F 8/51 715/703 |
| 9,805,076 | B2* | 10/2017 | Yalamanchi | G06F 16/24564 |
| 2002/0007483 | A1* | 1/2002 | Lopez | G06F 17/2247 715/234 |
| 2002/0100016 | A1* | 7/2002 | Van De Vanter | G06F 8/33 717/112 |
| 2004/0015517 | A1* | 1/2004 | Park | G06F 17/30017 |
| 2004/0044965 | A1* | 3/2004 | Toyama | G06F 17/2247 715/234 |
| 2004/0153992 | A1* | 8/2004 | Molina-Moreno | G06F 8/35 717/105 |
| 2004/0177315 | A1* | 9/2004 | Brown | G06F 17/2247 715/234 |
| 2004/0177321 | A1* | 9/2004 | Brown | G06F 17/2247 715/234 |
| 2005/0182749 | A1* | 8/2005 | Matsui | G06Q 10/06 |
| 2006/0078301 | A1* | 4/2006 | Ikeda | G11B 27/105 386/240 |
| 2006/0253419 | A1* | 11/2006 | Lin | G06F 16/24534 |
| 2007/0006134 | A1* | 1/2007 | Larvet | G06F 8/10 717/104 |
| 2007/0192716 | A1* | 8/2007 | Hamada | G06F 17/21 715/764 |
| 2007/0213598 | A1* | 9/2007 | Howard | A61M 5/142 600/300 |
| 2007/0299880 | A1* | 12/2007 | Kawabe | G06F 17/30011 |
| 2008/0097744 | A1* | 4/2008 | Levy | G06F 17/2247 704/4 |
| 2009/0063950 | A1* | 3/2009 | Gao | G06F 17/2247 715/234 |
| 2009/0125892 | A1* | 5/2009 | Crewdson | G06F 8/10 717/136 |
| 2010/0036860 | A1* | 2/2010 | Hiura | G06F 17/2247 707/634 |
| 2010/0241373 | A1* | 9/2010 | Watanabe | G06F 17/5081 702/58 |
| 2011/0022520 | A1* | 1/2011 | Ginter | G06F 21/10 705/51 |
| 2011/0035414 | A1* | 2/2011 | Barton | G06Q 30/02 707/802 |
| 2012/0192151 | A1* | 7/2012 | Parkes | G06F 8/34 717/120 |

FOREIGN PATENT DOCUMENTS

| | | | | |
|---|---|---|---|---|
| JP | 2010-266996 A | | 11/2010 | |
| JP | 2013054433 A | * | 3/2013 | ........ G06F 17/30312 |

OTHER PUBLICATIONS

Sakaki, Shungo, Yuji Onuki, Hiroshi Deguchi, "Socio-Informatics Architecture Design for Systems of National Accounts on I-Explosion Age", Shakai/Keizai System, Oct. 11, 2008, vol. 29, pp. 101-110.*

Asami, Tomoharu, "DSL Kudo Kaihatsu no Susume [Kohen] Model Renkei no Nagare to DSL no yoru Model Kijutsu: Part 2 JavaDSL ni yoru Model Kijutsu", IT Architect, Jan. 31, 2008 (received date), vol. 15, pp. 69-79.*

George Nagy, Data Extraction from Web Table: the Devil is in the Details, International Conference on Document Analysis and Recognition, 2011, all pages. (Year: 2011).*

Nagy et al. Data Extraction from Web Tables: The Devil is in the details, International Conference on Document Analyses and Recognition, 2011, all pages. (Year: 2011).*

Asami, Tomoharu, "DSL Kudo Kaihatsu so Susume [Kohen] Model Renkei no Nagare to DSL no yoru Model Kijutsu: Part 2 javaDSL ni yoru Model Kijustu", IT Architect, Jan. 31, 2008 (recieved date), vol. 15, pp. 69-79. Partial English translation attached.

Deguchi, Hiroshi, Yuji Onuki, Shungo Sakaki, "Joho Bakuhatsu Jidai no Kokumin Keizai Keisan no Architecture Design", Dai 70 Kai (Heisei 20 Nen) Zenkoku Taikai Koen Ronbunshu (5), Mar. 13, 2008, pp. 5-79 to 5-80 (1K-3). Partial English translation attached.

International Preliminary Report on Patentability for International Application No. PCT/JP2012/004363, dated Oct. 30, 2013. English translation attached.

Sakaki, Shungo, Yuji Onuki, Hiroshi Deguchi, "Socio-Informatics Architecture Design for Systems of National Accounts on I-Explosion Age", Shakai-Keizai Systemm Oct. 11, 2008, vol. 29, pp. 101-110. See attached English Abstract.

Written opinion of the International Searching Authority for the Internaltional Application No. PCT/JP2012/004363, dated Aug. 14, 2012. English translation attached.

International Search Report for the International Application No. PCT/ JP2012/004363, dated Aug. 14, 2012. English translation attached.

Japanese Notification of Reason(s) for Refusal corresponding to Patent Application No. 2011-190601; Dispatch Date: Apr. 7, 2015, with English translation.

* cited by examiner

FIG.1A

| DEBTOR | MONEY AMOUNT | | CREDITOR | MONEY AMOUNT |
|---|---|---|---|---|
| CASH | 200 | | APPLE | 100 |
| | | | PROFIT | 100 |
| UTILITIES | 50 | | CASH | 50 |

FIG.1B

| PROFIT | 100 | | OPERATING REVENUE | 100 |
|---|---|---|---|---|
| OPERATING REVENUE | 50 | | UTILITIES | 50 |

DATA EDITING APPARATUS 10

FIG.3

```
1 | program USER CODE EXAMPLE 1 {
2 |     var C:ExAlgeSet = [ 200@<"CASH"> + 100@<"WHEAT">,
 200@<"CASH"> + 200@<"SOY">];
3 |     var D:ExBaseSet = [<"CASH">, <"WHEAT">];
4 |     var aset:ExAlgeSet = { proj[b](x) | x <- C, b <- D, !isEmpty(x) };
5 |     var alpha:Exalge = sum(aset);
6 |     println("alpha = " + alpha);
7 | }
```

FIG.4A

```
10 | exalge2.ExAlgeSet
11 | C
12 | =
13 | new exalge2.ExAlgeSet(
14 | createArrayList(
15 | (new exalge2.Exalge(
16 | new exalge2.ExBase(new String[]{
17 | "CASH", exalge2.ExBase.NO_HAT})
18 | , new java.math.BigDecimal("200")))
19 | .plus(
20 | new exalge2.Exalge(
21 | new exalge2.ExBase(new String[]{
22 | "WHEAT", exalge2.ExBase.NO_HAT})
23 | , new java.math.BigDecimal("100")))
24 | , (new exalge2.Exalge(
25 | new exalge2.ExBase(new String[]{
26 | "CASH", exalge2.ExBase.NO_HAT})
27 | , new java.math.BigDecimal("200")))
28 | .plus(
29 | new exalge2.Exalge(
30 | new exalge2.ExBase(new String[]{
31 | "SOY", exalge2.ExBase.NO_HAT})
32 | , new java.math.BigDecimal("200"))))
33 | );
```

FIG.4B

```
44 | java.util.List<exalge2.Exalge> involv$6 =
 new java.util.ArrayList<exalge2.Exalge>();
45 | l_involv$6:
46 | for(exalge2.Exalge x :
47 | C) {
48 | for(exalge2.ExBase b :
49 | D) {
50 | if (!(!
51 | (isEmpty(
52 | x)))) continue;
53 | involv$6.add((x)
54 | .projection(
55 | b));
56 | }
57 | }
58 | exalge2.ExAlgeSet
59 | aset
60 |  = new exalge2.ExAlgeSet(
61 | involv$6
62 | );
```

FIG.5

```
 1 | program USER CODE EXAMPLE 2 {
 2 |     var dataset:DtAlgeSet = [
 3 |         "YAMADA"@<<"name","string">> + 5@<<"score","decimal">>,
 4 |         "TANAKA"@<<"name","string">> + 3@<<"score","decimal">>,
 5 |         "SUZUKI"@<<"name","string">> + 4@<<"score","decimal">>,
 6 |         "SATO"@<<"name","string">> + 2@<<"score","decimal">>,
 7 |         "HONDA"@<<"name","string">> + 5@<<"score","decimal">> ]
 8 |
 9 |     var aset:ExAlgeSet = { 1@<"4 OR MORE","PERSON"> | x <- dataset,
v = getDecimal[<<"score","decimal">>](x), v >= 4 };
10 |     println("aset = " + aset);
11 |     var ret:Exalge = sum(aset);
12 |     println("ret = " + ret);
13 | }
```

FIG.6A

```
11 | dtalge.DtAlgeSet
12 | dataset
13 | =
14 | new dtalge.DtAlgeSet(
15 | createArrayList(
16 | (new dtalge.Dtalge(
17 | dtalge.DtBase.newBase(new String[]{
18 | "name"
19 | ,"string"})
20 | , "YAMADA"))
21 | .put(
22 | new dtalge.Dtalge(
23 | dtalge.DtBase.newBase(new String[]{
24 | "score"
25 | ,"decimal"})
26 | , new java.math.BigDecimal("5")))
27 | ,(new dtalge.Dtalge(
28 | dtalge.DtBase.newBase(new String[]{
29 | "name"
30 | ,"string"})
31 | , "TANAKA"))
32 | .put(
33 | new dtalge.Dtalge(
34 | dtalge.DtBase.newBase(new String[]{
35 | "score"
36 | ,"decimal"})
37 | , new java.math.BigDecimal("3"))
38 | ,(new dtalge.Dtalge(
39 | dtalge.DtBase.newBase(new String[]{
40 | "name"
41 | ,"string"})
42 | , "SUZUKI"))
43 | .put(
44 | new dtalge.Dtalge(
45 | dtalge.DtBase.newBase(new String[]{
46 | "score"
47 | ,"decimal"})
48 | , new java.math.BigDecimal("4")))
49 | ,(new dtalge.Dtalge(
50 | dtalge.DtBase.newBase(new String[]{
51 | "name"
52 | ,"string"})
53 | , "SATO"))
54 | .put(
55 | new dtalge.Dtalge(
56 | dtalge.DtBase.newBase(new String[]{
57 | "score"
58 | ,"decimal"})
59 | , new java.math.BigDecimal("2")))
60 | ,(new dtalge.Dtalge(
61 | dtalge.DtBase.newBase(new String[]{
62 | "name"
63 | ,"string"})
64 | , "HONDA"))
65 | .put(
66 | new dtalge.Dtalge(
67 | dtalge.DtBase.newBase(new String[]{
68 | "score"
69 | ,"decimal"})
70 | , new java.math.BigDecimal("5"))))
71 | );
```

FIG.6B

```
71 | java.util.List<exalge2.Exalge> involv$7 =
new java.util.ArrayList<exalge2.Exalge>();
72 | l_involv$7:
73 | for(dtalge.Dtalge x :
74 | dataset) {
75 | java.math.BigDecimal v =
76 | (x)
77 | .getDecimal(
78 | dtalge.DtBase.newBase(new String[]{
79 | "score"
80 | ,"decimal"}));
81 | if (!((v)
82 | .compareTo
83 | (new java.math.BigDecimal("4"))
84 | >= 0)) continue;
85 | involv$7.add(new exalge2.Exalge(
86 | new exalge2.ExBase(new String[]{
87 | "4 OR MORE",exalge2.ExBase.NO_HAT
88 | ,"PERSON"})
89 | , new java.math.BigDecimal("1")));
90 | }
91 | exalge2.ExAlgeSet
92 | aset
93 |   = new exalge2.ExAlgeSet(
94 | involv$7
95 | );
```

DATA EDITING DEVICE AND DATA EDITING METHOD

This is the U.S. national stage of application No. PCT/JP2012/004363, filed on 5 Jul. 2012. Priority under 35 U.S.C. § 119(a) and 35 U.S.C. § 365(b) is claimed from Japanese Application No. 2011-190601, filed 1 Sep. 2011, the disclosure of which is also incorporated herein by reference.

TECHNICAL FIELD

The present invention relates to a data processing technology and, more particularly, to a data editing apparatus and a data editing method.

BACKGROUND ART

Conventional databases (for example, RDBs, XMLDBs, and the like) accumulate data in storage in accordance with a preset schema. Functions provided by databases can be roughly divided into the following three functions. The functions are: (1) a function of accumulating and retrieving data in storage; (2) a function of controlling access to accumulated data; and (3) a data editing function for extracting a necessary portion of retrieved data and converting the extracted portion when necessary.

[Patent Document No. 1] Japanese Patent Application Publication No. 2010-266996

DISCLOSURE OF THE INVENTION

Problem to be Solved by the Invention

With regard to the above (3) data editing function, a method for expressing data as a data object in a memory is not set in a standard manner, and there is a problem called OR (Object Relation) mapping for determining the format of the object in which the data is expressed. Also, a program description for operating the data object tends to become complicated, and it is often difficult for a user to understand the details of the data editing.

In this background, a purpose of the present invention is to provide a technology for supporting a user operation on a data object.

Means to Solve the Problem

A data editing apparatus according to one embodiment of the present invention includes: a data storage unit configured to store both a base indicating a data attribute and a data value in association with each other as data to be edited; a code acquisition unit configured to acquire a first code, which is a code described in a first program language for describing data editing details by intensive notation and which describes editing details for the data to be edited that are based on the base; a code generation unit configured to generate, in accordance with a preset correspondence relationship between a second program language for describing data editing details by extensive notation and the first program language, a second code, which is a code described in the second program language, based on the first code; and an editing processing unit configured to edit the data to be edited in accordance with the second code.

Another embodiment of the present invention relates to a data editing method. The method is a computer-implemented data editing method including: storing both a base indicating a data attribute and a data value in association with each other as data to be edited; acquiring a first code, which is a code described in a first program language for describing data editing details by intensive notation and which describes editing details for the data to be edited that are based on the base; generating, in accordance with a preset correspondence relationship between a second program language for describing data editing details by extensive notation and the first program language, a second code, which is a code described in the second program language, based on the first code; and editing the data to be edited in accordance with the second code.

Optional combinations of the aforementioned constituting elements, and implementations of the invention in the form of apparatuses, methods, systems, programs, and recording media storing programs may also be practiced as additional modes of the present invention.

Advantage of the Invention

According to the present invention, a user operation to a data object can be supported.

BRIEF DESCRIPTION OF THE DRAWINGS

FIG. 1 are diagrams each illustrating an example of a sales slip;

FIG. 3 is a diagram illustrating an example of a user code for operating accounting type data;

FIG. 4A is a diagram illustrating an execution code that corresponds to the user code shown in FIG. 3;

FIG. 4B is a diagram illustrating an execution code that corresponds to the user code shown in FIG. 3;

FIG. 5 is a diagram illustrating an example of a user code for operating record type data;

FIG. 6A is a diagram illustrating an execution code that corresponds to the user code shown in FIG. 5;

FIG. 6B is a diagram illustrating an execution code that corresponds to the user code shown in FIG. 5.

BEST MODE FOR CARRYING OUT THE INVENTION

Base Technology

Figure 2:
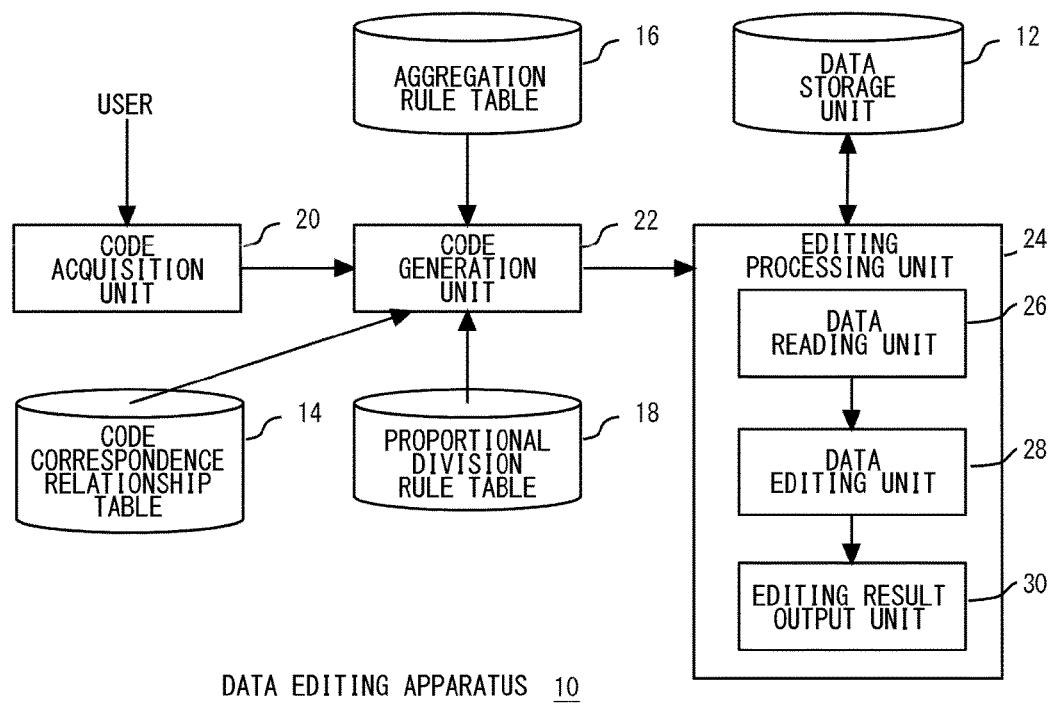
FIG. 2 is a block diagram illustrating a functional configuration of a data editing apparatus according to an embodiment.

An explanation is given of exchange algebra, on which a data editing technology shown in the present embodiment is based, before explaining the configuration of the embodiment of the present invention.

Inventors of the present invention consider that 80 to 90 percent of data in an organization such as a company can be expressed by two data structures shown in the following.

1. Multi-Classification Numerical Value Type (Hereinafter, Also Referred to as "Accounting Type Data")

This is a combination of a data value and a data attribute (hereinafter, also referred to as "base") where a numerical value is used as the data value and where a name, a unit, a time, and a subject are used as the data attribute. For example, data is expressed as: 40<cash, yen>+30<tangerine, piece> . . . .

2. Multi-Classification Mixed Type (Hereinafter, Also Referred to as "Record Type Data")

This is a combination of a data value and a base where numerical values or various literals other than a numerical value are used as the data value and the base. For example, data is expressed as: 55<age>+Taro Yamada <name>+Tsugaru <favorite fruit> . . . .

A detailed explanation is given mainly regarding accounting type data in the following.

Accounting type data belongs to an algebraic system (hereinafter, also referred to as "exchange algebra") for collectively expressing numerical value data provided for each classified item of some sort and then performing calculation and can be also considered as exchange algebra data. A base (i.e., classification item) in the accounting type data is composed of four items: <name, unit, time, subject>. The data is expressed by a combination of respective values for one or more bases, in other words, the data is expressed by the sum of the values for one or more bases.

$$x=200<\text{apple,yen},\#,\#>+400<\text{saury,yen},\#,\#> \quad \text{Example 1}$$

$$y=200<\text{apple,yen,first quarter of 2006},\#>+400<\text{apple, yen,second quarter of 2006},\#>+720<\text{apple,yen, third quarter of 2006},\#> \quad \text{Example 2}$$

In the above Example 1, both times and entities are omitted. In the above Example 2, the entities are omitted. Example 2 can be also considered as an expression of time-series data. For entities for the bases, identification information of organizations such as a name of a company and the like may be set.

Advantages of expression by exchange algebra include being able to express data using various bases (classifications) and being able to express bases in characters, not in program codes, that are easily understandable to humans. Further, expression by exchange algebra also allows for unified data editing by calculation called transfer as described later.

In exchange algebra according to the embodiment, a symbol, ˆ (hat), is used instead of a negative numerical value. For example, an equation, x=20ˆ<apple, #, #, #>, shows that apples are reduced by 20. In other words, "ˆ" represents a base that means an opposite item for offsetting a given item. Also, as an operator showing an offsetting operation, "~(bar)" is introduced. Examples thereof are shown in the following.

$$x1=30<\text{cash}>+20<\text{apple}>+50<\text{debt}>$$

$$y1=\hat{}x1=30\hat{}<\text{cash}>+20\hat{}<\text{apple}>+50\hat{}<\text{debt}>$$

$$\sim(y1+x1)=(30\hat{}<\text{cash}>+20\hat{}<\text{apple}>+50\hat{}<\text{debt}>)+ (30<\text{cash}>+20<\text{apple}>+50<\text{debt}>)=0$$

An explanation is now given regarding a transfer operation by exchange algebra. There is an operation called transfer in bookkeeping. This is considered as a type of a recategorization (base conversion) operation. An example is now shown where a sales slip of a vegetable shop shown in FIG. 1A is transferred to a sales slip shown in FIG. 1B.

Transactions in FIGS. 1A and 1B can be expressed in yen terms as shown in the following.

$$x1=200<\text{cash,yen}>+100\hat{}<\text{apple,yen}>+100<\text{profit, yen}>$$

$$x2=50<\text{utilities,yen}>+50\hat{}<\text{cash,yen}>$$

$$x3=100\hat{}<\text{profit,yen}>+100<\text{operating revenue,yen}>$$

$$x4=50\hat{}<\text{operating revenue,yen}>+50\hat{}<\text{utilities,yen}>$$

$$y=x1+x2+x3+x4=(200<\text{cash,yen}>+100\hat{}<\text{apple,yen}>+ 100<\text{profit,yen}>)+(50<\text{utilities,yen}>+50\hat{}<\text{cash, yen}>)+(100\hat{}<\text{profit,yen}>+100<\text{operating revenue,yen}>)+(50\hat{}<\text{operating revenue,yen}>+ 50\hat{}<\text{utilities,yen}>)$$

$$\sim y=150<\text{cash,yen}>+100\hat{}<\text{apple,yen}>+50<\text{operating revenue,yen}>$$

An explanation is now given of aggregation and proportional division, which are considered to be transfer operations.

1. Aggregation

It is assumed that there are 300 yen Tsugaru, 200 yen Fuji, and 100 yen Kougyoku (Tsugaru, Fuji, and Kougyoku each are a single breed of apples). This is expressed as: x=300<Tsugaru, yen>+200<Fuji, yen>+100<Kougyoku, yen>. This operation of collectively classifying Tsugaru, Fuji, and Kougyoku as "apple" is a type of a transfer and referred to as aggregation. A map showing a correspondence relationship, {Tsugaru, Fuji, Kougyoku}→{apple}, needs to be provided as a precondition.

In this example, an element, F(x)=300ˆ<Tsugaru, yen>+ 200ˆ<Fuji, yen>+100ˆ<Kougyoku, yen>+300<apple, yen>+ 200<apple, yen>+100<apple, yen>, is created in accordance with the above map showing the correspondence relationship. The value of the base <apple> represents respective values of the bases <Tsugaru>, <Fuji>, and <Kougyoku> to be aggregated. In other words, a totalization value of the respective values of the bases <Tsugaru>, <Fuji>, and <Kougyoku> to be aggregated is calculated as the value of the base <apple>.

A transfer G(x) that shows aggregation is provided using F(x) as follows: ~{x+F(x)}. In other words, G(x)=~{x+F(x)}=(300<Tsugaru, yen>+200<Fuji, yen>+100<Kougyoku, yen>)+(300ˆ<Tsugaru, yen>+200ˆ<Fuji, yen>+ 100ˆ<Kougyoku, yen>+300<apple, yen>+200<apple, yen>+100<apple, yen>)=600<apple, yen>.

2. Proportional Division

Proportional division is further division of a single classification item into a plurality of classification items. For example, in the example shown in the aggregation, proportional division means division of the value corresponding to the base <apple> into respective values of Tsugaru, Fuji, and Kougyoku. A proportional division ratio for {apple}→{Tsugaru, Fuji, Kougyoku} needs to be provided as a prerequisite and is 1:1:1 in this case.

In this example, an element, F(x)=600ˆ<apple, yen>+ 200<Tsugaru, yen>+200<Fuji, yen>+200<Kougyoku, yen>, is created for x=600<apple, yen> in accordance with the above proportional division ratio.

A transfer G(x) that shows proportional division is provided using F(x) as follows: ~{x+F(x)}. In other words, G(x)=~{x+F(x)}=600<apple, yen>+(600ˆ<apple, yen>+ 200<Tsugaru, yen>+200<Fuji, yen>+200<Kougyoku, yen>)=200<Tsugaru, yen>+200<Fuji, yen>+200<Kougyoku, yen>.

Embodiment

An explanation is given in the following regarding an information processing apparatus (hereinafter, referred to as "data editing apparatus") that performs a data editing process using the idea of the above exchange algebra. In the present embodiment, a user describes data editing details using intensive notation, which is a method of describing a set by providing conditions necessary and sufficient for an object to belong to the set. Based on the editing details described by the intensive notation, the data editing apparatus according to the embodiment outputs a program code described in extensive notation, which is a method of describing a set by listing all the elements of the set. The data editing apparatus then reads data to be edited into memory as a data object in a format that corresponds to exchange algebra and performs an editing process on the data by executing the above program code.

FIG. 2 is a block diagram illustrating a functional configuration of a data editing apparatus 10 according to the embodiment. The data editing apparatus 10 includes a data storage unit 12, a code correspondence relationship table 14, an aggregation rule table 16, a proportional division rule table 18, a code acquisition unit 20, a code generation unit 22, and an editing processing unit 24.

The blocks shown in the block diagram of the specification are implemented in the hardware by any CPU of a computer, other elements, or mechanical devices and in software by a computer program or the like. FIG. 2 depicts functional blocks implemented by the cooperation of hardware and software. Thus, a person skilled in the art should appreciate that there are many ways of accomplishing these functional blocks in various forms in accordance with the components of hardware, software, or the combination of both. For example, the functional blocks of FIG. 2 may be stored in a recording medium as software. The software may be installed in a hard disk of the data editing apparatus 10, read into a main memory of the data editing apparatus 10, and run by a CPU.

The data storage unit 12 is a memory area that stores both data before editing, which is to be edited, and data after the editing. The data storage unit 12 stores a CSV (Comma Separated Values) file associating a data value with a base for each of the data before the editing and the data after the editing. For example, a line of a CSV file may be "value, the presence of hat, name, unit, time, subject," and a blank line may indicate a separator of elements. It is obvious that the data storage unit 12 may be provided in an information processing apparatus different from the data editing apparatus 10, for example, inside a database server. In this case, an information processing system may be constructed where the database server and the data editing apparatus 10 are connected via a communication network such as LAN, WAN, Internet, etc.

The code correspondence relationship table 14 is a memory area that stores a correspondence relationship between a program language for describing data editing details (editing operations) by the intensive notation (hereinafter, also referred to as "intensive notation language") and a program language for describing data editing details by the extensive notation (hereinafter, also referred to as "extensive notation language"). It is assumed that the extensive notation language according to the embodiment is a Java (registered trademark) language. Alternatively, the extensive notation language may be other program languages such as a C language.

The correspondence relationship between the intensive notation language and the extensive notation language is, for example, association of a keyword indicating an editing operation in the intensive notation language with a code (function) in which logic for realizing the editing operation in the extensive notation language is implemented. More specifically, a description of a condition for extracting specific data from a plurality of pieces of data in the intensive notation language is associated with a description of a repeat order (command) for sequentially listing a plurality of pieces of data in the extensive notation language. For example, the correspondence relationship is association of a code for specifying input data in the intensive notation language with a code in which logic for reading the input data into memory in the extensive notation language is implemented. A specific example of the correspondence relationship will be described later in FIGS. 3 through 6.

The aggregation rule table 16 is a memory area that stores an aggregation rule defining an aggregation relationship between a plurality of types of bases that needs to be referred to at the time of an aggregation operation. The aggregation rule defines, for example, the above-stated aggregation relationship, {Tsugaru, Fuji, Kougyoku}→{apple}. A base ("apple" in the above example) that aggregates a plurality of types of bases is referred to as "aggregation base" in the following. The proportional division rule table 18 is a memory area that stores a proportional division rule defining a proportional division rate of a plurality of types of bases that needs to be referred to at the time of a proportional division operation. The proportional division rule defines, for example, the above-stated proportional division relationship, {apple}→{Tsugaru, Fuji, Kougyoku}, and a proportional division rate, 1:1:1.

The code acquisition unit 20 acquires a program code (hereinafter, also referred to as "user code") that is input by a user via a predetermined input apparatus such as a keyboard. This user code is described in an intensive notation language. A detailed description of a specific example of the user code will follow.

In accordance with the correspondence relationship stored in the code correspondence relationship table 14, the code generation unit 22 generates, based on the user code, a program code (hereinafter, also referred to as "execution code") in which the data editing details described in the user code are described in an extensive notation language. It is assumed that an execution code according to the embodiment is a Java bytecode. More specifically, the code generation unit 22 generates a Java source code that corresponds to the user code and generates a Java bytecode by compiling the source code. A detailed description of a specific example of the execution code will follow.

In accordance with the execution code generated by the code generation unit 22, the editing processing unit 24 edits data to be edited that is stored in the data storage unit 12. The editing processing unit 24 includes a data reading unit 26, a data editing unit 28, and an editing result output unit 30. Needless to say, the function of the editing processing unit 24 (the data reading unit 26 through the editing result output unit 30) may be achieved by the execution of the execution code in a predetermined execution engine. For example, when the execution code is a Java bytecode, the execution engine is a JVM (Java Virtual Machine).

The data reading unit 26 reads the data to be edited from the data storage unit 12 and generates, based on the data, a data object in which a data value and a base are associated with each other in the memory. The data editing unit 28 sets editing result data by performing an operation on the data object generated by the data reading unit 26. The editing result output unit 30 records, as a CSV file, the editing result data set by the data reading unit 26 and stores the CSV file in the data storage unit 12.

FIG. 3 illustrates an example of a user code for operating accounting type data. In the following code example, line numbers are shown at the left end, and the position of a code is appropriately shown by the line numbers. Specified as data to be edited in FIG. 3 is a set C containing an element, 200<cash>+100<wheat>, and an element, 200<cash>+200<soy>. In the figure, the data to be edited is directly input for the purpose of simplifying the figure. Typically, a data object that indicates input data is generated by specifying the name of a CSV file serving as an input file and a position for describing the input data in the CSV file.

Specified in line 4 in FIG. 3 is a projection process of exchange algebra, that is, a projection operation for extracting a subelement that agrees with a specified base. More specifically, a process is specified, which is a process of extracting, from the set C, an element that corresponds to the base <cash> or the base <wheat> and that satisfies a condition where a value is already set and assigning the element to a set aset. Specified in line 5 is a process of adding elements in the set aset. Since the set aset includes 200 <cash>, 100 <wheat>, and 200 <cash>, an addition result alpha is: 400<cash>+100<wheat>. In the figure, an editing result is output to standard output for the purpose of simplifying the figure. Typically, a CSV file is specified as an output file, and the editing result (in this case, the details of the addition result alpha) is recorded in the CSV file.

FIG. 4A illustrates an execution code that corresponds to the user code shown in FIG. 3. More specifically, the execution code is an execution code generated by the code generation unit 22 according to line 2 in FIG. 3 and corresponds to a function of the data reading unit 26. In the explanation of the embodiment, a Java source program is shown as the execution code for the sake of convenience. In the figure, an ExAlge object that corresponds to an element, 200<cash>+100<wheat>, (lines 15-23) and an ExAlge object that corresponds to an element, 200<cash>+200<soy>, (lines 24-32) are stored in an ExAlgeSet object that corresponds to the set C.

FIG. 4B illustrates an execution code that corresponds to the user code shown in FIG. 3. More specifically, the execution code is an execution code generated by the code generation unit 22 according to line 4 in FIG. 3 and corresponds to a function of the data editing unit 28. In the figure, a projection method is called in a double loop of a for loop listing ExAlge objects that correspond to a plurality of elements included in a set C and a for loop listing ExBase objects that correspond to a plurality of bases included in a set D, and a result of a projection process is added to a list. A set aset is then set based on the list.

FIG. 5 illustrates an example of a user code for operating record type data. In the figure, a set dataset is specified that includes five elements: Yamada <name>+5<score>; Tanaka <name>+3<score>; Suzuki <name>+4<score>; Sato <name>+2<score>; and Honda <name>+5<score>.

In line 9 in FIG. 5, a process is specified that assigns an element "1 <4 or more, person, #, #>" to a set aset whenever there is an element whose value associated with a base <score> is four or more. Specified in line 11 is a process of adding elements in the set aset. As a result of this, the set aset includes three elements "1 <4 or more, person, #, #>," and "ret=3 <4 or more, person, #, #>" is obtained. In other words, this example is directed to totalize the number of people with a score of four or more.

FIG. 6A illustrates an execution code that corresponds to the user code shown in FIG. 5. More specifically, the execution code is an execution code generated by the code generation unit 22 according to lines 2-7 in FIG. 5 and corresponds to a function of the data reading unit 26. In the figure, Dtalge objects that respectively correspond to the above five record type data elements are stored in a DtAlgeSet that corresponds to a set dataset. Various data types are accepted in both a value and a base for record type data. Thus, information indicating respective data types of a value and a base are also set for the Dtalge object.

FIG. 6B illustrates an execution code that corresponds to the user code shown in FIG. 5. More specifically, the execution code is an execution code generated by the code generation unit 22 according to line 9 in FIG. 5 and corresponds to a function of the data editing unit 28. In the figure, an element "1 <4 or more, person, #, #>" is added to a list when a value that corresponds to a base <score> is four or more in a for loop listing DtAlgeSet objects that corresponds to a plurality of elements included in a set dataset. A set aset is then set based on the list.

When an aggregation order (function) is set in a user code, the code generation unit 22 generates an execution code for setting an object (hereinafter, also referred to as "intermediate object") that corresponds to a bookkeeping description in reference to the aggregation rule stored in the aggregation rule table 16. More specifically, the code generation unit 22 calculates a totalization value of a plurality of pieces of data to be aggregated and generates an execution code that sets, as an intermediate object, an object indicating an element that adds up data associating the totalization value with an aggregation base and data indicating the subtraction of the respective values of the plurality of pieces of data to be aggregated (i.e., data where hat attributes are added to the plurality of pieces of original data to be aggregated). This intermediate object corresponds to F(x) shown in the aggregation in the base technology.

The code generation unit 22 then adds up an object indicating an element where the plurality of pieces of original data to be aggregated are added up and the intermediate object. In other words, by offsetting the plurality of pieces of original data to be aggregated with data where hat attributes are added to the plurality of pieces of original data to be aggregated, the code generation unit 22 generates an execution code for storing, in an object for a totalization result, data associating the totalization value of the plurality of pieces of data to be aggregated with the aggregation base. This execution code corresponds to ~(x+F(x)) shown in the aggregation in the base technology. The code generation unit 22 may further generate an execution code for outputting the details of the intermediate object to a predetermined file. According to the embodiment, by presenting the details of the intermediate object to a user, efficient debugging can be supported, and information that is usable in transfer calculation for bookkeeping can be provided to the user.

When a proportional division order (function) is set in a user code, the code generation unit 22 first generates an execution code for setting the intermediate object in reference to the aggregation rule stored in the proportional division rule table 18, as in the case of aggregation. More specifically, the code generation unit 22 proportionally divides, in accordance with a proportional division rate, the value of data to be proportionally divided and generates an execution code that sets, as an intermediate object, an object indicating an element that adds up data associating proportionally-divided values with respective bases of a destination of the proportional division and data where hat attributes are added to the original data to be proportionally divided. This intermediate object corresponds to F(x) shown in the proportional division in the base technology.

The code generation unit 22 then adds up an object indicating an element of the original data to be proportionally divided and the intermediate object. In other words, by offsetting the original data to be proportionally divided with data where hat attributes are added to the original data to be proportionally divided, the code generation unit 22 generates an execution code for storing, in an object for a proportional division result, data associating the proportionally-divided values with respective bases of the destination of the proportional division. This execution code corresponds to ~(x+F(x)) shown in the proportional division in the base technology. The code generation unit 22 may further generate an execution code for outputting the details of the intermediate object to a predetermined file, as in the case of aggregation.

An explanation is given of the operation of the above configuration in the following.

Figure 7:
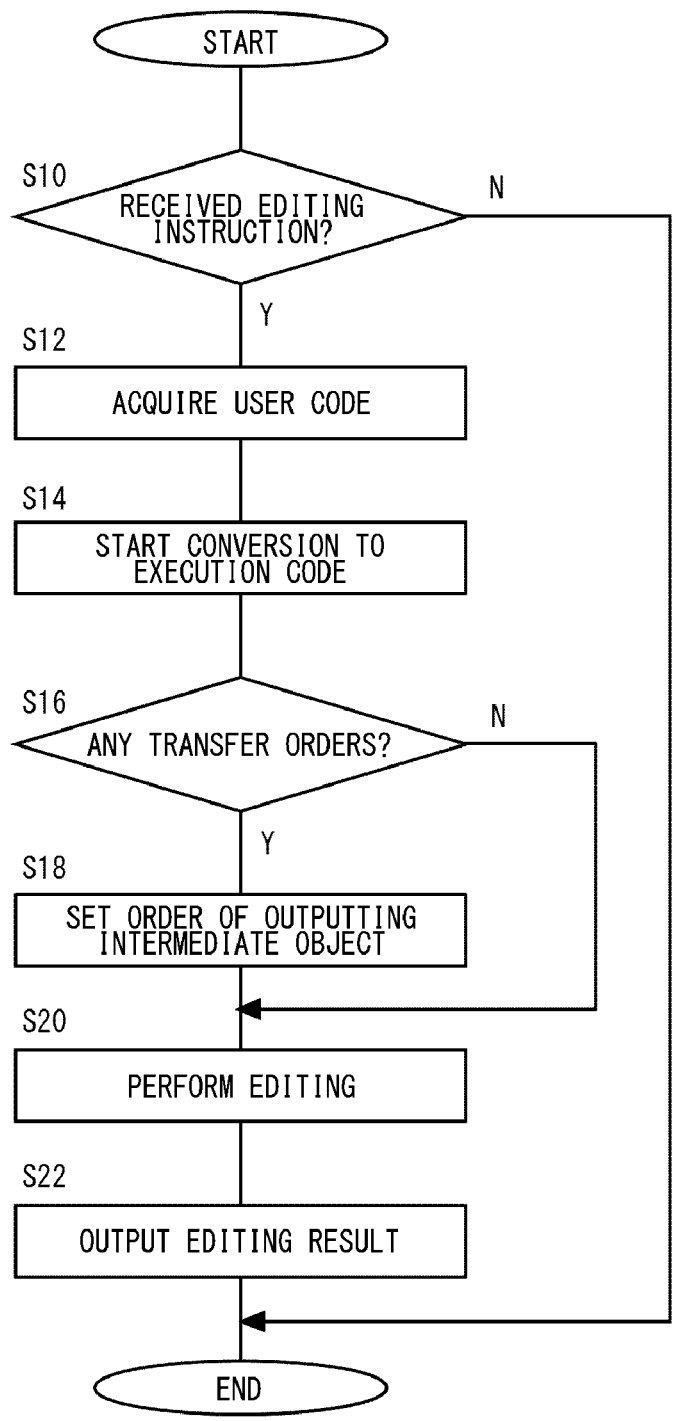
FIG. 7 is a flowchart illustrating the operation of the data editing apparatus.

FIG. 7 is a flowchart illustrating the operation of the data editing apparatus 10. The user first describes data editing details using an intensive notation language by intensive notation and inputs a data editing instruction specifying a program code thereof to the data editing apparatus 10. When the data editing apparatus 10 receives the data editing instruction via a predetermined input apparatus (Y in S10), the code acquisition unit 20 of the data editing apparatus 10 acquires, as a user code, the program code input by the user (S12). In accordance with a correspondence relationship between a user code and an execution code stored in the code correspondence relationship table 14, the code generation unit 22 starts a process of generating an execution code based on the user code (S14).

When there is a transfer order such as an aggregation order or a proportional division order in the user code (Y in S16), the code generation unit 22 sets, in the execution code, an order of outputting an intermediate object for an offset process according to the transfer order (S18). When there is no transfer order in the user code (N in S16), S18 is skipped. The editing processing unit 24 performs an editing process on data to be edited in accordance with the execution code that has been generated (S20). For example, the data reading unit 26 reads the data to be edited, which is specified in the user code and the execution code generated based on the user code, from a CSV file for input data storage of the data storage unit 12 and generates a data object. The data editing unit 28 performs an editing operation (such as a projection operation, an aggregation operation, and a proportional division operation based on a base) specified in the execution code for the data object that has been generated and generates a data object that indicates an editing result. The editing result output unit 30 outputs an editing result by the editing processing unit 24, for example, the details (attribute values) of the data object that has been generated by the data editing unit 28 and that indicates the editing result, to a CSV file for editing result storage of the data storage unit 12 (S22). When the data editing apparatus 10 does not receive any data editing instructions (N in S10), S12 and subsequent steps thereof are skipped.

According to the data editing apparatus 10 of the present embodiment, data that is conventionally treated in an RDB can be expressed as a data object that corresponds to accounting type data or a data object that corresponds to record type data. Thereby, the standardization of data object expression in a computer can be supported. Also, a complicated mechanism such as an RDB is not necessary in the accumulation of data to be edited, and the accumulation can be enabled in a CSV file with high visibility.

The data editing apparatus 10 allows the user to describe data editing details in an intensive notation language. Thus, as long as the user correctly understands the data editing details, the user can achieve correct data editing even when the user does not actually understand an extensive notation language for operating a computer. In the data editing apparatus 10, data to be edited is stored as a combination of a value and a base. Thus, the user can easily describe editing details, which are based on a base, by using the intensive notation. Intensive notation is to reflect the specification of data editing without depending on a computer. Thus, the user can achieve correct data editing as long as the user provides a correct specification description. For example, the user needs to describe data editing details according to a specification without paying attention to a for loop or the like. Therefore, inclusion of bugs in a user code can be reduced.

In other words, bug generating parts can be easily limited to bugs of the data itself. For example, in an operation of accounting type data, various transfer processes such as aggregation and proportional division can be robustly described.

Even when there is a change in the format (schema) of data, the data editing apparatus 10 allows the range of effects caused by the change to be limited by performing an editing process for a value based on a base of the data. For example, even when columns in a table storing data to be edited are switched, effects on editing logic in a user code can be eliminated.

Also, the data editing apparatus 10 allows rules for a transfer process, such as aggregation and proportional division, to be stored in a table outside a program code. Thus, even when there is a change in the rules, data of the table needs to be changed, and effects in the program code can thus be eliminated.

Described above is an explanation of the present invention based on the embodiments. These embodiments are intended to be illustrative only, and it will be obvious to those skilled in the art that various modifications to constituting elements and processes could be developed and that such modifications are also within the scope of the present invention.

For example, the data editing apparatus 10 may further comprise a transfer rule table. The transfer rule table is a memory area that stores a transfer rule to be referred to in a transfer operation (it is assumed to be a base changing operation that does not involve aggregation or proportional division in this case). The transfer rule is data that associates a base of a transfer source with a base of a transfer destination. When a transfer order is set in a user code, the code generation unit 22 generates an execution code for setting an intermediate object F(x) in reference to the transfer rule stored in the transfer rule table. For example, when $$x = \text{numerical value } A < \text{base of transfer source}>,$$

the following is obtained:

F(x)=numerical value A^ <base of transfer source>+numerical value A <base of transfer destination>. The code generation unit 22 generates an execution code that corresponds to ~(x+F(x)). As a result of executing the code, "numerical value A <base of transfer source>" is changed to "numerical value A <base of transfer destination>" in the above example.

Optional combinations of the aforementioned embodiment and exemplary variations will also be within the scope of the present invention. New embodiments resulting from the combinations will provide the advantages of the embodiment and variations combined.

It will be obvious to those skilled in the art that functions to be achieved by constituent features described in claims are implemented by each of constituent features shown in the embodiments or the exemplary variations or by the cooperation of these constituent features.

DESCRIPTION OF THE REFERENCE NUMERALS 10 data editing apparatus, 12 data storage unit, 14 code correspondence relationship table, 16 aggregation rule table, 18 proportional division rule table, 20 code acquisition unit, 22 code generation unit, 24 editing processing unit, 26 data reading unit, 28 data editing unit, 30 editing result output unit

INDUSTRIAL APPLICABILITY

The present invention is applicable to a computer for executing a data editing process.

The invention claimed is:

1. An exchange algebra data editing apparatus comprising:
a memory configured to store exchange algebra data to be edited that is composed of a base indicating a data attribute and a data value;
a comma separated values (CSV) file;
a first processor configured to acquire a first code described by a user in a first program language for describing data editing details by intensive notation which is a method for describing a data set by providing conditions necessary and sufficient for a data to belong to it;
a correspondence relationship table configured to store a preset correspondence relationship between the first program language and a second program language for describing data editing details by extensive notation which is a method for describing a data set by listing all elements of the data set;
a second processor configured to generate, in accordance with the correspondence relationship stored in the correspondence relationship table, a second code which is an execution code to edit the exchange algebra data based on the base; and
an editing processor configured to edit the exchange algebra data automatically in accordance with the second code and output an edited result to the CSV file,
wherein when a projection operation specifying both a data set, from which a plurality of exchange algebra data are extracted, and one or more extraction base which serve as a condition for the extraction, is included in the first code, the second processor generates a second code which includes a first repeat order for sequentially listing a plurality of elements included in the data set and a second repeat order for sequentially listing one or more extraction base, and in which a process of extracting an element having the extraction base is described as a repetitive process by these repeat orders.

2. The exchange algebra data editing apparatus according to claim 1,
wherein a numerical value is used as the exchange algebra data value and at least one of a name, a unit, a period, and a subject is used as the base in the data to be edited.

3. The exchange algebra data editing apparatus according to claim 1,
wherein when an aggregation order is included in the first code, the second processor generates, in accordance with information predefining an aggregation base serving as a base that aggregates respective bases of the plurality of pieces of exchange algebra data, a second code for outputting a totalization result that associates a totalization value of the respective values of the plurality of pieces of data with the aggregation base.

4. The exchange algebra data editing apparatus according to claim 3,
wherein the second processor further generates a second code for outputting intermediate data that associates an exchange algebra symbol indicating the subtraction of respective data values of a plurality of pieces of exchange algebra data to be aggregated with the totalization result.

5. A computer-implemented exchange algebra data editing method comprising:
storing, in a memory, exchange algebra data to be edited that is composed of a base indicating a data attribute and a data value;
acquiring, with a first processor, a first code, which is a code described by a user in a first program language for describing data editing details by intensive notation which is a method for describing a data set by providing conditions necessary and sufficient for a data to belong to it;
generating, with a second processor and in accordance with a preset correspondence relationship between the first program language and a second program language for describing data editing details by extensive notation which is a method for describing a data set by listing all elements of the data set, a second code, which is an execution code to edit the exchange algebra data based on the base; and
editing, with an editing processor, the exchange algebra data automatically in accordance with the second code and outputting an edited result to a comma separated values (CSV) file,
wherein when a projection operation of specifying both a data set, from which a plurality of exchange algebra data are extracted, and one or more extraction base which serve as a condition for the extraction, is included in the first code, a second code is generated, which includes both a first repeat order for sequentially listing a plurality of elements included in the data set and a second repeat order for sequentially listing one or more extraction base, and in which a process of extracting an element having the extraction base is described as a repetitive process by these repeat orders.

6. An exchange algebra data editing apparatus comprising:
a memory configured to store exchange algebra data to be edited that is composed of a base indicating a data attribute and a data value;
a comma separated values (CSV) file;
a first processor configured to acquire a first code described by a user in a first program language for describing data editing details by intensive notation which is a method for describing a data set by providing conditions necessary and sufficient for a data to belong to it;
a correspondence relationship table configured to store a preset correspondence relationship between the first language and a second program language for describing data editing details by extensive notation which is a method for describing a set by listing all elements of the data set;
a second processor configured to generate, in accordance with the correspondence relationship stored in the correspondence relationship table, a second code which is an execution code to edit the exchange algebra data based on the base and which describes editing details; and
an editing processor configured to edit the exchange algebra data automatically in accordance with the second code and output an edited result to the CSV file,
wherein when an aggregation order is included in the first code, the second processor generates, in accordance with information predefining an aggregation base serving as a base that aggregates respective bases of the plurality of pieces of exchange algebra data, a second code for outputting a totalization result that associates a totalization value of the respective values of the plurality of pieces of data with the aggregation base, and outputs intermediate data that associates an exchange algebra symbol indicating the subtraction of respective data values of a plurality of pieces of exchange algebra data to be aggregated with the totalization result.

7. An exchange algebra data editing apparatus comprising:
- a memory configured to store exchange algebra data to be edited that is composed of a base indicating a data attribute and a data value;
- a comma separated values (CSV) file;
- a first processor configured to acquire a first code described by a user in a first program language for describing data editing details by intensive notation which is a method for describing a data set by providing conditions necessary and sufficient for a data to belong to it;
- a correspondence relationship table configured to store a preset correspondence relationship between the first program language and a second program language for describing data editing details by extensive notation which is a method for describing a set by listing all elements of the data set;
- a second processor configured to generate, in accordance with the correspondence relationship stored in the correspondence relationship table, a second code which is an execution code to edit the exchange algebra data based on the base; and
- an editing processor configured to edit the exchange algebra data automatically in accordance with the second code and output an edited result to the CSV file.

* * * * *